United States Patent [19]
Usui et al.

[11] Patent Number: 4,714,326
[45] Date of Patent: Dec. 22, 1987

[54] METHOD AND ELEMENT FOR OPTICAL MODULATION

[75] Inventors: Masayuki Usui, Yokohama; Hiroyuki Imataki, Kawasaki; Takashi Serizawa; Takeshi Baba, both of Yokohama; Hiroyasu Nose, Tokyo, all of Japan

[73] Assignee: Canon Kabushiki Kaisha, Tokyo, Japan

[21] Appl. No.: 706,269

[22] Filed: Feb. 27, 1985

[30] Foreign Application Priority Data

Mar. 5, 1984 [JP] Japan .................. 59-41837

[51] Int. Cl.⁴ ............................................ G02B 26/00
[52] U.S. Cl. ..................................... 350/485; 350/360
[58] Field of Search ............... 350/484, 485, 359, 360, 350/363

[56] References Cited
U.S. PATENT DOCUMENTS

| | | |
|---|---|---|
| 3,443,098 | 5/1969 | Lewis ................................. 350/485 |
| 3,556,638 | 1/1971 | Banks et al. ....................... 350/485 |
| 4,113,360 | 9/1978 | Baur et al. ......................... 350/484 |

Primary Examiner—Bruce Y. Arnold
Attorney, Agent, or Firm—Fitzpatrick, Cella, Harper & Scinto

[57] ABSTRACT

Optical modulation is carried out by providing a transparent member having a surface, providing an elastomeric body disposed spaced apart from the surface, irradiating the surface with a light beam, and causing the elastomeric body to contact the surface so that the proportion of the light beam transmitted through the surface is changed.

17 Claims, 7 Drawing Figures

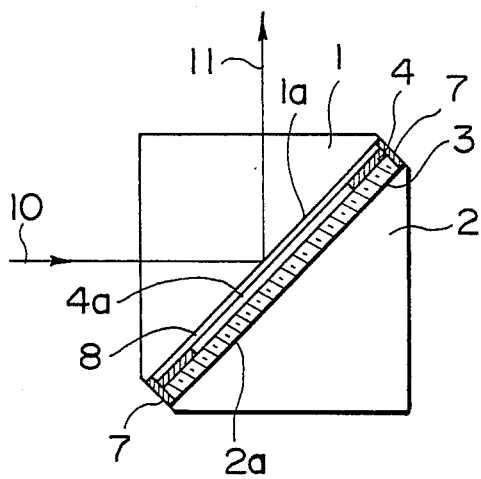
FIG. IA
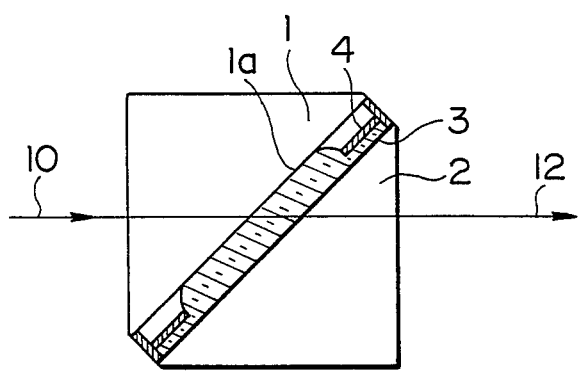
FIG. IB

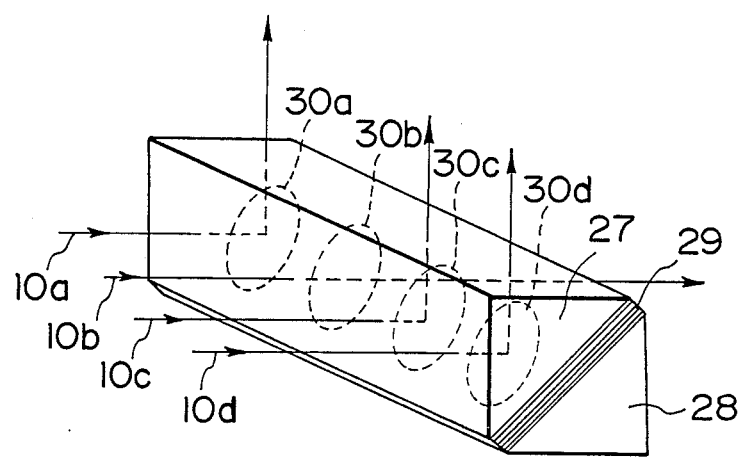
F I G. 5
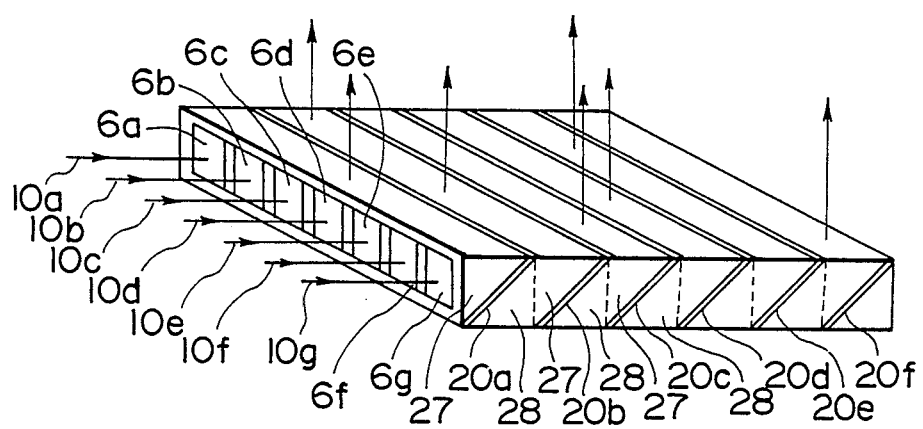
F I G. 6

METHOD AND ELEMENT FOR OPTICAL MODULATION

BACKGROUND OF THE INVENTION

The present invention relates to an optical modulation method using an elastic body, and an optical modulation element therefor.

Heretofore, various optical modulation methods have been known. Typically, those methods using A/O modulation elements, E/O modulation elements, M/O modulation elements, etc., have been known. However, as these methods use crystal members, there is a restriction from the point of material. There are further restrictions such that wavelengths of applicable light is restricted to a specific range. Furthermore, these elements are not adapted to being formed into an elongated shape or arranged in the form of an array, so that the application of these elements is also restricted.

SUMMARY OF THE INVENTION

An object of the present invention is to provide a novel optical modulation method having removed the above-mentioned drawbacks of the conventional elements.

Another object of the present invention is to provide an optical modulation method with little restriction about wavelengths of light and a material for an optical modulation element to be used.

Still another object of the present invention is to provide an optical modulation method adapted to a wide variety of applications including a printer and a display device.

A further object of the present invention is to provide an optical modulation element adapted for use in the above-mentioned method and also for being formed into an elongated shape or in the form of an array.

The optical modulation method according to the present invention comprises providing a transparent member having a surface, providing an elastic body disposed spaced apart from the surface, irradiating the surface with a light beam, and causing the elastic body to contact the surface so that the proportion of the light beam transmitted through the surface is changed.

The optical element according to the present invention comprises a first prism and a second prism disposed spaced apart from each other, an elastic body disposed on a part of the surface facing the first prism of the second prism, and a pressing member so disposed on the elastic body as to be capable of pressing the elastic body.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 includes sectional views for illustrating an embodiment of the optical modulation element according to the present invention, wherein FIG. 1A shows a state where an incident light beam is totally reflected and FIG. 1B shows a state where an incident light beam is transmitted;

FIG. 5 is a perspective view showing still another embodiment of the optical modulation element according to the invention; and FIG. 6 is a perspective view showing still different embodiment of the optical modulation element according to the invention.

DETAILED DESCRIPTION OF THE INVENTION

Figure 3:
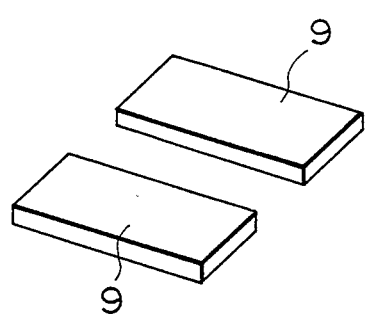
FIG. 3 is a perspective view of another example of a pressing member.

FIGS. 1A and 1B are views for illustrating a fundamental mode of the optical modulation method and an optical modulation element used therein. In the figures, a first prism 1 and a second prism 2 are spaced apart from each other with a predetermined gap by means of spacers 7. These prisms may be in the same shape or in different shapes depending on the purpose. A layer of transparent elastic body 3 is disposed on a surface of the second prism 2. On the peripheral part of the elastic body 3 is disposed a pressing member 4 driven by a driving means (not shown) and capable of pressing the elastic body 3 toward the second prism 2. The pressing member has or defines an opening 4a, the shape of which may be circular, rectangular, polygonal other than the rectangular, etc. Alternatively, the pressing member may be composed of a pair of members 9 disposed spaced apart from each other, as shown in FIG. 3, on the elastic member 3.

The first prism 1 has a surface 1a facing the second prism 2 and forming an interface with air or the elastic layer 3. The surface 1a may be coated, if necessary, with a film of Teflon (polytetrafluoroethylene), etc., in order to prevent the adhesion thereof with the elastic body 3. Instead, the surface layer of the elastic member 3 may be cured or hardened, e.g., by incorporating therein a crosslinking agent, to such an extent that any adhesivity of the surface is removed. It is possible that the surface 1a of the first prism 1 contacting the elastic body can be curved.

Thus, the optical element shown in FIG. 1 comprises a first prism 1 and a second prism 2 spaced apart from each other, an elastic body 3 disposed on a part of the surface facing the first prism 1 of the second prism 2, and a pressing member 4 so disposed on the elastic body 3 that it is capable of pressing the elastic body 3.

In the state shown in FIG. 1A, the elastic body 3 is not pressed or compressed and a gap 8 is left between the elastic body 3 and the first prism 1, so that a light beam 10 entering the first prism 1 is totally reflected by the surface or interface 1a and travels in a deflected light path to issue upwardly. The conditions for the total reflection of light are well known and need not be described in detail. Briefly speaking, however, assuming that the first prism 1 has a refractive index of 1.5, total reflection occurs, if the incident angle of the light beam traveling in the first prism 1 with respect to the interface 1a is 41.8° or greater.

Next, when the elastic body 3 is pressed or compressed by the pressing member 4, the pressed elastic body 3 protrudes out of the opening 4a of the pressing member 4 and is pressed against the surface 1a as shown in FIG. 1B. When the elastic body 3 is transparent and has a refractive index substantially equal to that of the first prism 1, the incident light beam 10 does not cause total reflection at the interface 1a but passes the interface as it is to issue as a light beam 12. As a result, the optical path of the incident light beam 10 is switched depending on whether the elastic body is pressed or not pressed, whereby the optical element shown in FIG. 1 functions as an optical switch.

The elastic body 3 can be composed of a nontransparent, light-absorbing material. In this case, the incident light beam is totally reflected or absorbed depending on whether the elastic body is pressed or not pressed, whereby the element shown in FIG. 1 can be used as an optical modulation element.

The incident light beam is not only visible light but also may be light of any wavelength including ultraviolet light and infrared light. It is only required for the incident light that it can attain either one state of total reflection and transmission or absorption, depending on whether the elastic body 3 is pressed against the first prism 1.

In the above example, the pressing member 4 is moved to cause protrusion of the elastic member out of the opening 4a, so that the elastic member 3 is in or out of contact with the first prism. Alternatively, it is possible to move the prisms 1 and 2 per se by an external force, so that the elastic body disposed between the prisms is in or out of contact with the prisms. Further, it is also possible to cause voluminous expansion or shrinkage of the elastic body by applying heat or a chemical action thereto, so that the elastic body is in or out of contact with the surface 1a.

Figure 2:
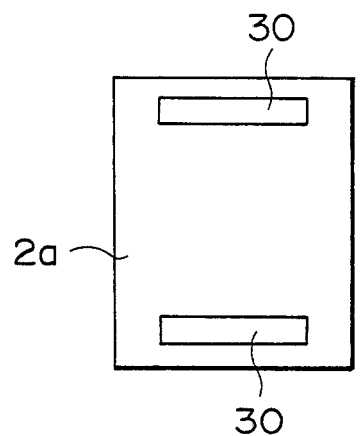
FIG. 2 is a view illustrating an example wherein electromagnets are disposed on a second prism.

The pressing member 4 may be moved, for example, as follows. Accordingly, a pressing member 4 made of an iron plate can be moved by turning on or off electromagnets 30 disposed on a face 2a (facing the prism 1) of the second prism 2 (as shown in FIG. 2) with the medium of the elastic layer 3.

The elastic body which can be utilized in the present invention may be any material which undergoes deformation when a force is applied thereto and returns to its original form before deformation, provided that the force applied is not too large (within the elastic limit), i.e., has an elasticity.

In ordinary solids, the maximum strain within the elastic limit (limiting strain) is about 1%. In contrast, in a vulcanized elastic rubber, the elastic limit is very large, with its limiting strain being as large as approximately 1000%.

In the optical device according to the present invention, any material having a desired modulus of elasticity corresponding to the characteristics of the optical device to be formed may be used. However, it is generally preferred to use a material with a smaller modulus of elasticity, in order to obtain easily a large elastic deformation or in order to make the state after deformation optically more homogeneous.

The modulus or elasticity (G) is represented by $G = \rho/\gamma$ (where $\rho$ = stress, $\gamma$ = elastic strain). An elasticity capable of giving a large deformation with a small stress is called as high elasticity or rubber elasticity, and therefore such a kind of elastic body is preferably utilized in the present invention.

Such rubbery elastic bodies are generally known as "rubbers", including natural rubber, styrenebutadiene rubber (SBR), isoprene rubber (IR), ethylenepropylene rubber (EPM, EPDM), butyl rubber (IIR), chloroprene rubber (CR), acrylonitrile-butadiene rubber (NBR), urethane rubber (U), silicone rubber (SI), fluorine rubber (FPM), polysulfide rubber (T), polyether rubber (POR, CHR, CHC) and others. Among them, ethylene-propylene-rubber or silicone rubber which is transparent to visible light can be effectively used. Any of these rubbers is rubbery at room temperature. However, polymeric materials in general assume either a glassy, rubbery or molten state depending on the degree of the Brownian movement. Accordingly, polymeric materials exhibiting the rubbery state within the temperature range at which the optical device is used can be utilized as elastic bodies of the present invention. The modulus of elasticity under the rubbery state can be determined depending on the degree of crosslinking of polymeric chains constituting the elastomer. Thus, vulcanization of natural rubber is nothing but a treatment which determines the modulus of elasticity.

The elastic body to be used in the present invention should desirably be deformed greatly with a small stress, and for this purpose it is important to control the degree of crosslinking.

However, reduction in elasticity (tendency to exhibit greater deformation with smaller stress) leads to, on the other hand, lowering in strength. Therefore, it is necessary to choose adequately an elastic body to be used so that the strength corresponding to the purpose of the optical device to be formed can be maintained. Also, modulus of elasticity is measured by various methods depending on the kind of stress under use in the optical device, for example, by measurement of tensile, flexural or compression strength.

The elastic body to be used in the present invention should have a modulus of elasticity smaller than $10^{11}$ to $10^{13}$ dyne/cm$^2$ of ordinary solid materials, appropriately not more than $10^8$ dyne/cm$^2$, preferably not more than $10^6$ dyne/cm$^2$, particularly preferably not more than $5 \times 10^5$ dyne/cm$^2$. The lower limit should preferably be as small as possible, provided that the elastomer when constituting the optical device has a shape-retaining property, as different from liquids in general. In this regard, optical devices are used at room temperature in most cases but may sometimes be used at higher or lower temperatures. Thus, the above values for modulus of elasticity should be understood as those at the temperature at which the optical device is used.

Hardness or softness of an elastic body depends more or less on its elasticity. According to JIS K 6301, a simple method for evaluation of hardness of rubber is defined, in which a minute strain is given by a spring on a sample surface to measure its penetration.

However, if the elasticity is as low as $10^6$ dyne/cm$^2$ or lower, it cannot be measured according to the above method. In such a case, ¼ inch microconsistometer is used and the measured value of penetration is used for evaluation.

Also, when the modulus of elasticity is small, it is difficult to determine its value according to "tensile-elongation" relationships and therefore its value is determined by compression (5% deformation). The value can be correlated to the penetration as previously mentioned.

Rubbery elastomers, other than the vulcanized (crosslinked) products well known in the art, are inclusive of ethylene-vinyl acetate copolymers and butadiene-styrene block copolymers which require no vulcanization, or alternatively, they can be obtained by appropriate gelling (controlling the molecular chain length between the crosslinked points) of a chain polymer.

These rubbers are controlled in their elasticities by controlling their crosslinking degrees, combination of molecules in block copolymer or the state of gelling.

Also, instead of controlling the elastic body through the structure of the elastic body itself, its characteristics can be also changed or controlled by addition of a diluent or a filler.

For example, when a silicone rubber (KE-104, trade name, produced by Shinetsu Kagaku Kogyo K.K. and a catalyst (Catalyst-104, trade name, produced by Sinetsu Kagaku Kogyo K.K.) are added, hardness and tensile strength are lowered, while elongation increased contrarily, as the amounts of addition increase.

Such a material can have various moduli of elasticity depending on its density of crosslinking. If a particularly large deformation is desired, it is effective to use a polymer gelled with a small density of crosslinking. It is also possible to vary refractive index or dispersion by mixing various kinds of materials with the elastomer.

Figure 4:
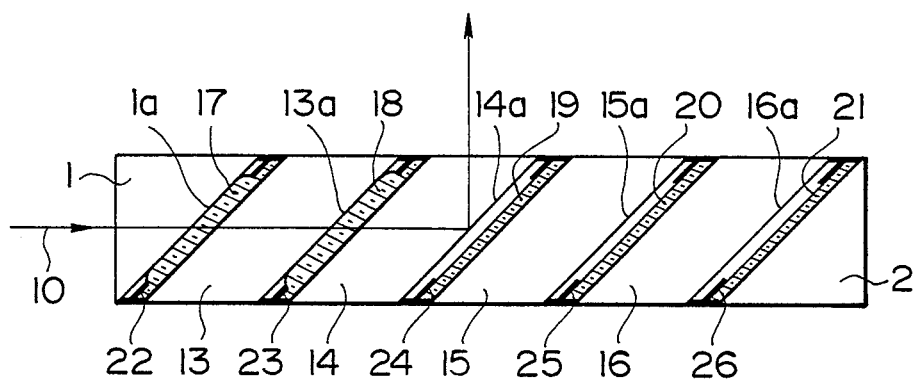
FIG. 4 is a sectional view showing another embodiment of the optical modulation element according to the invention.

FIG. 4 shows another embodiment of the optical modulation element according to the invention, which has a structure comprising an array or stack of optical elements, each of which is substantially the same in function as the one explained with reference to FIG. 1.

In FIG. 4, the members denoted by reference numerals 1, 13, 14, 15, 16 are prisms; 17, 18, 19, 20, 21 elastic bodies; and 22, 23, 24, 25, 26 pressing members. Each of the pressing members is driven by a driving means (not shown) independently of the other to press an elastic member, so that the elastic member is placed in contact with a surface 1a, 13a, 14a, 15a or 16a. Thus, the combination including the prisms 1 and 13 corresponds to the optical element shown in FIG. 1. Likewise, the combinations including the prisms 13 and 14, 14 and 15, 15 and 16, and 16 and 2, are respectively equivalent to the optical element shown in FIG. 1. An incident light beam enters the element or device shown in FIG. 4 from the left, passes successively surfaces or interfaces 1a and 13a contacting elastic bodies 17 and 18, and is totally reflected at an interface 14a which is spaced apart from an elastic body 19 to issue upward. Thus, the element shown in FIG. 4 wherein unit elements are arranged or stacked in the form of an array functions as an optical switching array capable of successive scanning or random scanning.

The element shown in FIG. 4 is constituted by stacking two types of prisms, one including the prisms 1 and 2 and the other including the prisms 13-16. A similar function of element is also formed by arranging an optical element as shown in FIG. 1 in the direction of the incident light 10.

FIG. 5 shows another embodiment of the optical modulation element according to the present invention. The element or device shown in FIG. 5 fundamentally has a structure in which a plurality of elements each equivalent to the one shown in FIG. 1 are arranged in the form of an array or in parallel with each other with respect to incident light beams. Thus, a plurality of pressing members 29 each capable of being driven independently from the others are disposed between prisms 27 and 28 for respective openings 30a-30d and respective incident beams 10a-10d. This embodiment is different from the second embodiment shown in FIG. 4 in that the unit elements are arranged in an array in a direction perpendicular to that of the incident light while the array shown in FIG. 4 is formed in the direction of the incident light. The function of each unit switching element is substantially the same as that of the first embodiment shown in FIG. 1. This embodiment is characteristic in that, as distinguished from the second embodiment, a plurality of incident light beams can be modulated independently and simultaneously and thus functions as a monodimensional light value.

The prism 27 (or prism 28) may be formed of a single body or an assembly of a plurality of prisms. Instead, a plurality of optical elements each equivalent to the one shown in FIG. 1 are arranged in a direction perpendicular to the direction of the incident light 10, so that an assembly of unit optical elements which is as a whole equivalent to the element array shown in FIG. 5.

FIG. 6 shows still another embodiment of the optical modulation element according to the present invention, wherein a plurality of array elements each equivalent to the one shown in FIG. 5 are arranged or stacked with each other to form a two-dimensional light valve. In the optical element shown in FIG. 6, each pressing member 29 (refer to FIG. 5) is driven independently of the others. The total number of the pressing members 29 is equal to the product of the number of windows through which the respective incident beams 10a-10g enters by the number of element arrays arranged in the direction of the incident light beams, each element array being equivalent to the one shown in FIG. 5. Prisms 27 and 28 are contiguous with each other and forming a pair are constituted by separate bodies in this embodiment but may be composed of a single body.

Being constituted as described above, the element or device shown in FIG. 6 can be driven in such a manner that light beams 10a-10g entering the element from a side face thereof can be issued from an arbitrary place of an upper surface of the element. The element thus constituted can be suitably applied to a thin display device, since the thickness in the light-issuing or viewing direction of the element can be made thin.

Further, a device equivalent to the one shown in FIG. 6 may also be composed by arranging a plurality of the optical modulation elements shown in FIG. 4 in a direction perpendicular to those of the beams 10a-10g or by arranging two-dimensionally a plurality of the optical modulation elements as shown in FIG. 1.

As described hereinabove, the present invention provides an optical modulation method and an optical modulation element therefor adapted for a variety of applications including a printer head and a display device. Further, a wide variety of elastic materials can be utilized for the optical modulation element. Further, from the viewpoint of production, it is less difficult to make the element in an elongated form, an array form or large-area form as compared with a device such as an IC (integrated circuit). In the above embodiment of the optical modulation method according to the present invention, total reflection of light is utilized. However, the critical angle for the total reflection is hardly influenced by the wavelengths of the light used. Accordingly, the method has an advantage that the light to be used is hardly restricted with respect to its wavelengths.

The present invention will be further described with reference to a working example.

EXAMPLE

An optical modulation element as shown in FIG. 1A was produced in the following manner.

An iron plate having an opening with a diameter of 10 mm was used as the pressing member 4. The elastic body 3 was formed by a silicone rubber (trade name: KE 104 Gel, produced by Shinetsu Kagaku K.K.).

Electromagnets were disposed in the neighborhood of the pressing member 4 and actuated to move the iron plate up and down by the magnetic force thereof. As a result, the silicone rubber was pressed or compressed to protrude out of the opening.

When the silicone rubber was caused to protrude out of the opening, it contacted a surface 1a of a prism disposed 1 mm spaced apart from the silicone rubber under no pressure to form a region of 5 mm in diameter where no total reflection occurred.

Incidentally, a perforation was provided in the side of the pressing member so that the space between the prism and the silicone was in communication with the outside and the change in pressure in the space due to movement of the iron plate was prevented.

What is claimed is:

1. An optical modulation method comprising:
providing a transparent member having a surface,
providing an elastomeric body disposed spaced apart from the surface,
providing a pressing member having an opening substantially in contact with the elastomeric member,
irradiating the surface with a light beam; and
causing the protrusion of the elastomeric body out of the opening of the pressing member to contact the surface so that the proportion of the light beam transmitted through the surface is changed.

2. The optical modulation method according to claim 1, wherein the light beam is totally reflected at the surface when the elastomeric body is out of contact with the surface and is transmitted through the surface when the elastomeric body is in contact with the surface.

3. The optical modulation method according to claim 1, wherin said elastomeric body is transparent.

4. The optical modulation method according to claim 1, wherein said elastomeric body is light-absorbing.

5. An optical modulation element comprising:
a first prism having a first surface and a second prism having a second surface, the first and second-surfaces facing each other and disposed spaced apart from each other; an elastomeric body disposed on a part of the second surface; and a pressing member having an opening so disposed on the elastomeric body as to be capable of pressing the elastomeric body so that the resultant protrusion out of the opening of the elastomeric body contacts the first surface and changes the proportion of an incident light beam transmitted through the first surface.

6. The optical modulation element according to claim 5, wherein a part of the surface facing the elastomeric body of the first prism is coated with a polytetrafluoroethylene film.

7. The optical modulation element according to claim 5, wherein said elastomeric body is transparent.

8. The optical modulation element according to claim 5, wherein said elastomeric body is light absorbing.

9. The optical modulation element according to claim 5, wherein said elastomeric body has a modulus of elasticity of not more than $10^8$ dyne/cm$^2$.

10. The optical modulation element according to claim 9, wherein said elastomeric body has a modulus of elasticity of not more than $5 \times 10^5$ dyne/cm$^2$.

11. The optical modulation element according to claim 5, wherein the elastomeric body comprises silicone rubber.

12. An optical modulation element comprising a plurality of the optical elements according to claim 5 arranged in the direction of the incident light beam.

13. An optical modulation element comprising a plurality of the optical elements according to claim 5 arranged in a direction perpendicular to the direction of the incident light beam.

14. An optical modulation element comprising a plurality of the optical elements according to claim 5 arranged two-dimensionally in the direction of an incident light beam and in a direction perpendicular thereto.

15. An optical modulation method comprising:
providing a plurality of combinations of (a) a transparent member having a surface, and (b) an elastomeric body disposed spaced apart from the surface; wherein the plurality of combinations are arranged along the direction of an irradiating light beam;
irradiating the surface of one of said combinations with said light beam; and
causing each elastomeric body to contact the corresponding surface of one transparent member independently of the others so that the proportion of the light beam transmitted through the surface is changed.

16. An optical modulation method comprising:
providing a plurality of combinations of (a) a transparent member having a surface, and (b) an elastomeric body disposed spaced apart from the surface, wherein the plurality of combinations are arranged along and perpendicularly to the direction of an irradiating light beam;
irradiating the surface of at least one of said combinations with the light beam; and
causing each elastomeric body to contact the corresponding surface of one transparent member independently of the others so that the proportion of the light beam transmitted through the surface is changed.

17. An optical modulation method comprising:
providing a plurality of combinations of (a) a transparent member having a surface, and (b) an elastomeric body disposed spaced apart from the surface, wherein the plurality of combinations are arranged perpendicularly to the direction of an irradiating light beam;
irradiating the surface of at least one of said combinations with said light beam; and
causing each elastomeric body to contact the corresponding surface of one transparent member independently of the others so that the proportion of the light beam transmitted through the surface is changed.

* * * * *

UNITED STATES PATENT AND TRADEMARK OFFICE
CERTIFICATE OF CORRECTION

PATENT NO. : 4,714,326                    Page 1 of 2
DATED     : December 22, 1987
INVENTOR(S) : MASAYUKI USUI, ET AL.

It is certified that error appears in the above-identified patent and that said Letters Patent is hereby corrected as shown below:

COLUMN 2

Line 2, close up left margin.
    Line 9, "showing still" should read --showing a still--.

COLUMN 3

Line 56, "or" should read --of--.
    Line 63, "styrenebutadiene" should read
        --styrene-butadiene--.
    Line 64, "ethylenepropylene" should read
        --ethylene-propylene--.

COLUMN 4

Line 2, "propylene-rubber" should read --propylene rubber--.

COLUMN 5

Line 9, "K.K. and" should read --K.K.) and--.

COLUMN 6

Line 7, "Instead" should read --In that embodiment--.
    Line 11, "elements" should read --elements is formed--.
    Line 22, "enters" should read --enter--.
    Line 26, "are" (first occurrence) should be deleted.

UNITED STATES PATENT AND TRADEMARK OFFICE
CERTIFICATE OF CORRECTION

PATENT NO. : 4,714,326

DATED : December 22, 1987

INVENTOR(S) : MASAYUKI USUI, ET AL.

It is certified that error appears in the above-identified patent and that said Letters Patent is hereby corrected as shown below:

COLUMN 7

Line 38, "wherin" should read --wherein--.
Line 43, "second-sur-" should read --second sur---.
Line 62, "light absorbing" should read --light-absorbing--.

COLUMN 8

Line 8, "the" should read --said--.

Signed and Sealed this

Thirty-first Day of May, 1988

Attest:

DONALD J. QUIGG

Attesting Officer

Commissioner of Patents and Trademarks